(12) United States Patent
Thurston et al.

(10) Patent No.: US 9,994,471 B2
(45) Date of Patent: Jun. 12, 2018

(54) LIVESTOCK WASTEWATER TREATMENT SYSTEM AND METHOD

(75) Inventors: Ross Thurston, Calgary (CA); Karen Schuett, Calgary (CA)

(73) Assignee: IWR Technologies Ltd. (CA)

( * ) Notice: Subject to any disclaimer, the term of this patent is extended or adjusted under 35 U.S.C. 154(b) by 194 days.

(21) Appl. No.: 12/435,471

(22) Filed: May 5, 2009

(65) Prior Publication Data
US 2010/0282678 A1    Nov. 11, 2010

(51) Int. Cl.
| | | |
|---|---|---|
| C02F 9/08 | (2006.01) | |
| C02F 9/02 | (2006.01) | |
| C02F 1/44 | (2006.01) | |
| C02F 1/52 | (2006.01) | |
| C02F 9/00 | (2006.01) | |
| C02F 1/00 | (2006.01) | |
| C02F 1/56 | (2006.01) | |
| C02F 1/66 | (2006.01) | |
| C02F 11/12 | (2006.01) | |
| C02F 103/20 | (2006.01) | |

(52) U.S. Cl.
CPC ............... *C02F 9/00* (2013.01); *C02F 1/001* (2013.01); *C02F 1/44* (2013.01); *C02F 1/56* (2013.01); *C02F 1/66* (2013.01); *C02F 11/121* (2013.01); *C02F 2001/007* (2013.01); *C02F 2103/20* (2013.01)

(58) Field of Classification Search
None
See application file for complete search history.

(56) References Cited

U.S. PATENT DOCUMENTS

| | | | | |
|---|---|---|---|---|
| 3,658,697 A | * | 4/1972 | Huether | ............... C02F 1/283 |
| | | | | 210/617 |
| 4,173,532 A | | 11/1979 | Keoteklian | |
| 4,348,285 A | | 9/1982 | Groeneweg et al. | |
| 4,482,459 A | | 11/1984 | Shiver | |
| 5,614,102 A | * | 3/1997 | Sakurada | ............... 210/718 |
| 5,698,102 A | | 12/1997 | Khudenko | |

(Continued)

FOREIGN PATENT DOCUMENTS

| | | |
|---|---|---|
| CA | 2343832 A1 | 10/2002 |
| WO | WO 95/21140 A1 | 8/1995 |
| WO | 2004089833 | 10/2004 |

OTHER PUBLICATIONS

Piero M. Armenante, "Coagulation and Flocculation", obtained from the internet archives and published Jul. 11, 2003, (http://cpe.njit.edu/dlnotes/che685/cls07-1.pdf).*

(Continued)

*Primary Examiner* — Dirk Bass
(74) *Attorney, Agent, or Firm* — Jackson Walker LLP

(57) ABSTRACT

An improved livestock wastewater treatment system for treating wastewater produced by a confined animal feeding operation (CAFO) facility to reclaim water and solids from the wastewater, and to reduce the environmental footprint of the CAFO facility is provided. The treatment system combines both mechanical and chemical water treating and includes separation of liquids from solids, collection of the separated solids at various stages, and treatment of the remaining liquid so that it can be reclaimed. Methods of treating livestock wastewater with the livestock wastewater treatment system is also provided.

18 Claims, 4 Drawing Sheets

(56) References Cited

U.S. PATENT DOCUMENTS

| | | | |
|---|---|---|---|
| 5,846,425 | A | 12/1998 | Whiteman |
| 5,885,461 | A | 3/1999 | Tetrault et al. |
| 6,083,386 | A | 7/2000 | Lloyd |
| 6,245,121 | B1 | 6/2001 | Lamy et al. |
| 6,409,788 | B1 | 6/2002 | Sower |
| 6,663,782 | B2 | 12/2003 | Morse et al. |
| 7,005,068 | B2 | 2/2006 | Hoffland |
| 7,045,063 | B2 | 5/2006 | Zhang et al. |
| 7,520,993 | B1 * | 4/2009 | Laraway et al. ............ 210/652 |
| 2001/0025820 | A1 | 10/2001 | Morse et al. |
| 2002/0030012 | A1 | 3/2002 | Sullivan |
| 2006/0021407 | A1 | 2/2006 | Poudrette et al. |
| 2006/0249449 | A1 * | 11/2006 | Nakhla et al. ............. 210/605 |
| 2006/0283221 | A1 | 12/2006 | Camisa |
| 2009/0134080 | A1 * | 5/2009 | Fabig ........................ 210/137 |

OTHER PUBLICATIONS

Notification of the Third Office Action; Applicant 423079 Alberta Ltd.; Application No. 201080019917.6; Title Livestock Wastewater Treatment System and Method, 23 pages dated Apr. 24, 2014.

Decision of Rejection; Applicant 423079 Alberta Ltd.; Application No. 201080019917.6; title Livestock Wastewater Treatment System and Method, 8 pages dated Nov. 13, 2014.

European Search Report and Opinion, No. 10771935.3-1351/2429958, PCT/CA201000679, 6 pages dated Apr. 14, 2015.

Demirel, B. et al, Anaerobic treatment of dairy wastewaters; a review, Process Biochemistry, 2005. 40(8) pp. 2583-2595. (13 pages) Jul. 31, 2005.

Christensen, M.L. et al., Characterization of pig slurry with reference to flocculation and separation, Water Research, 2009. 43(3): pp. 773-783 (11 pages) Feb. 28, 2009.

Davis, M.L., Water and wastewater engineering; design principles and practice. 2010: McGraw Hill (2 pages) Apr. 12, 2010.

Sincero, A.P., G.A., Sincero, G.A. Sincero, Physical-chemical Treatment of Water and Wastewater. 2002: IWA Pub. (1 page) Jul. 29, 2002.

Crittenden, J.C. et al., MWH's Water Treatment: Principles and Design. 2012: John Wiley & Sons, pp. 644 and 645 Apr. 30, 2012.

Federation, W.E., Industrial Wastewater Management, Treatment, and Disposal, 3e MOP FD-3. 2008: McGraw-Hill Education (1 page) Jul. 8, 2008.

Mohamed, S.M., Industrial Wastewater Treatment Plants Inspection Procedures Manual, May 2002. May 31, 2002.

Hjorth, M. et al., Polymer flocculation mechanism in animal slurry establised by charge neutralization, Water Research, 2012. 46(4): pp. 1045-1051 (7 pages) Mar. 15, 2012.

Rajeshwari, K.V. et al., State-of-the-art of anaerobic digestion technology for industrial wastewater treatment, Renewable and Sustainable Energy Reviews, 2000. 4(2): pp. 135-156 (22 pages) Jun. 30, 2000.

Masse, L. et al. The use of membranes for the treatment of manure: a critical literature review, Biosystems Engineering, 2007. 98(4): pp. 371-380 (10 pages) Dec. 31, 2007.

Centrisys. Manure Separation. Available from: http://centrisys.com/industries/animal/waste. (2 pages) Dec. 31, 2015.

Aqua-Innovations. Agricultural Waste Recycling. Available from: http://aquainnovationsllc.com/agricultural/ (2 pages) Jan. 1, 2016.

Digested-Organics. Nutrient Concentration & Water Reclamation System. Available from: http://digestedorganics.com/solutions/nutrient-concentration-water-reclamation/#tab-id-3 (8 pages) Dec. 31, 2014.

AL-2-Tecknik. Available from: http://uk.al-3teknik.dana9.dk/ (2 pages) Mar. 3, 2016.

McLanahan. Nutrient Separation Systems. Available from: http://mclanahan.com/p/Nutrient_Separation_Systems/531/357 (1 page) Jan. 1, 2016.

Jasper-Hill-Farm. The green machine. Available from: http://www.jasperhillfarm.com/green-machine/ (1 page) Mar. 3, 2016.

Trident. Nutrient Recovery Solutions. Available from: http://manuresystemsinc.com/solutions/nutrient-recovery/ (1 page) Jan. 1, 2016.

NC-State-University, Dairy liquid manure slurry characteristics. Available from: https://www.bae.ncsu.edu/topic/animal-waste-mgmt/program/land-ap/barker/a&pmp&c/dlm.htm (1 page) Mar. 3, 2016.

NC-State-University. Swine liquid manure slurry characteristics. Available from: https://www.bae.ncsu.ecu/topic/animal-waste-mgmt/program/land-ap/barker/a&pmp&c/slm.htm (1 page) Mar. 3, 2016.

Notification of Re-examination, State Intellectual Property of Office of the P.R.C., Peoples Republic of China, Application/Patent No. 201080019917.6, Issued document ID 5071400692030, Case ID 1F188110, 10 pages, English translation 13 pages dated Jul. 17, 2015.

Decision on Reexamination, Pat. App. No. 201080019917.6, State Intellectual Property Office of P. R. China, 16 pages dated Dec. 11, 2015.

Communication under Rule 71(3) European application No. 10771935.3, dated Aug. 18, 2017, 7 pages.

* cited by examiner

LIVESTOCK WASTEWATER TREATMENT SYSTEM AND METHOD

FIELD OF THE INVENTION

The present invention relates generally to the treatment of wastewater, and more particularly, relating to a livestock wastewater treatment system and method for reclaiming solids and water from the wastewater.

BACKGROUND OF THE INVENTION

Waste management is a major challenge for many commercial livestock facilities, and this is particularly the case in confined animal feeding operation (CAFO) facilities. In CAFO facilities, livestock, such as cows, chickens, and swine, are housed in buildings. Animal waste including solid and liquid manure and urine, as well as other animal feeding and housing by-products that accumulate in the livestock buildings must be removed to maintain a healthy living environment. Most often, the waste is flushed from the livestock buildings with water creating environmental hazardous wastewater. Handling of this wastewater presents several different environmental challenges, including air contamination caused by the odor released by the waste, ground water and stream contamination from runoffs, and soil contamination, among others.

Commonly, the wastewater is collected and retained in large pits/lagoons. In the lagoons, the water and other volatiles are allowed to evaporate into the atmosphere leaving a watery sludge that accumulates at the bottom of the lagoon, which eventually requires disposal. Problems with this existing method include the requirement of large land areas for the lagoons, ground water contamination cause by waste leaking from the lagoons, stream contamination from lagoon runoff, air contamination caused by odors released by the waste contained in the lagoons, among others.

There have been attempts to reduce waste produced by the animals, eliminate storage lagoons, reduce storage lagoon size requirement, and reduce environmental impact of storage lagoons. These attempts include systems for reclaiming water from lagoons, air treatment for volatile emissions, lagoon covers to reduce volatile emissions, solid-liquid separation, and animal diet manipulation and/or chemical additives into the animal feed, among others. However, none of these systems or methods fully solve the many problems inherent with waste treatment.

Other problems facing livestock producers are the costs of a constant supply of fresh water for drinking and washing, the costs of land for spreading, the costs of lagoons and nuisance odor complaints. In addition, legislation continues to tighten for air and water discharge levels of pollutants including phosphorus and methane.

Accordingly, there is a need and a desire for an improved livestock wastewater treatment system and method that reduces the environmental footprint of a CAFO facility, and provides a source of fresh water, and reclaims waste solids and liquids for fertilizer. The present invention solves these and other problems.

SUMMARY OF THE INVENTION

The preferred embodiments of the present invention provide an improved livestock wastewater treatment system that reduces ammonium and phosphorous in discharge water permitting the water to be used on site, eliminates the requirement of lagoons, reduces the expense of waste management, reduces odor emissions, produces solid and liquid fertilizer suitable for land application, among others.

To achieve these and other advantages, in general, in one aspect, a livestock wastewater treatment system is provided. The livestock wastewater treatment system including a sludge dewatering device including a wastewater inlet, a fluid discharge and a solids discharge; a chemical conditioner including an fluid inlet and a fluid discharge; a suspended solids separator including a fluid inlet, a fluid discharge, and a solids discharge; a fine solids filter device including an fluid inlet and fluid discharge; a membrane filter unit including a fluid inlet, a reclaimed water discharge and a concentrated liquid discharge. The fluid inlet of the chemical conditioner is fluidically connected to the liquid discharge of the sludge dewatering device. The fluid inlet of the suspended solids separator is fluidically connected to the fluid discharge of the chemical conditioner. The fluid inlet of the fine solids filter device is fluidically connected to the liquid discharged of the suspended solids separator. The fluid inlet of the membrane filter unit is fluidically connected to the fluid discharge of the fine solids filter device.

In one embodiment, the sludge dewatering device is a screw press. In one embodiment, the suspended solids separator is a plate clarifier. In one embodiment, the plate clarifier is a lamella plate clarifier.

In one embodiment, the membrane filter unit includes a water polishing unit having the polished water discharge and a liquid concentrating unit having the concentrated liquid discharge.

In one embodiment, the chemical conditioner includes a first chemical injector unit, a first mixer, a second chemical injector unit, and a second mixer. The first chemical injector unit, the first mixer, the second chemical injector unit, and second mixer being fluidically connected in series between the inlet and the discharge of the chemical conditioner.

In one embodiment, the fine solids filter device includes a multiple-media filter unit, a first bag filter unit, and a second bag filter unit. The first bag filter unit and the second bag filter unit being fluidically connected in parallel, and the multiple-media filter being connect upstream to the first and second bag filter units.

In general, in another aspect, a livestock wastewater treatment system is provided. The livestock wastewater treatment system includes a sludge dewatering device configured to separate a solids-fluid wastewater mixture into separate solid and fluid flows. A chemical conditioner configured to aggregate suspended solids in the fluid flow into floc. A suspended solids separator configured to remove the floc from the fluid flow. A fine solids filter device configured to remove fine solids from the fluid flow. A membrane filter unit configured to separate the fluid flow into a permeate fluid flow and an effluent fluid flow, and to concentrate the effluent fluid flow into a fluid concentrate. The fine solids filter device is downstream from the suspended solids separator, and the membrane filter is downstream from the fine solids filter device.

In one embodiment, the sludge dewatering device is a screw press. In one embodiment, the suspended solids separator is a lamellar plate clarifier.

In one embodiment, the chemical conditioner includes a first chemical injector unit, a first mixer, a second chemical injector unit, and a second mixer. The first chemical injector unit, the first mixer, the second chemical injector unit, and second mixer being fluidically connected in series between the inlet and the discharge of the chemical conditioner.

In one embodiment, the fine solids filter device includes a multiple-media filter unit, a first bag filter unit, and a second bag filter unit. The first bag filter unit and the second bag filter unit being fluidically connected in parallel, and the multiple-media filter being connect upstream to the first and second bag filter units.

In general, in another aspect, a method of treating livestock wastewater is provided. The method comprising the steps of:
- (a) separating a solids-fluid wastewater mixture in a sludge dewatering device into a solids effluent and a first fluid effluent;
- (b) adding flocculants to the first fluid effluent causing suspended solids in the first fluid effluent to aggregate into floc to form a second fluid effluent;
- (c) separating the floc from the second fluid effluent in a suspended solids separator to form a third fluid effluent;
- (d) passing the third effluent through a fine solids filter device to form a forth fluid effluent; and
- (e) passing the forth fluid effluent through a membrane filter unit to form permeate fluid and a fluid concentrate.

In other embodiments, in the method, the permeate fluid is reclaimed water, and the concentrate fluid is liquid fertilizer; the sludge dewatering device is a screw press; and the suspended solids separator is a lamellar plate clarifier.

In general, in another aspect, a method of treating livestock wastewater is provided. The method comprising the steps of:
- (a) separating a solids-fluid wastewater mixture in a sludge dewatering device into a solids effluent and a first fluid effluent;
- (b) adding flocculants to said first fluid effluent causing suspended solids in said first fluid effluent to aggregate into floc to form a second fluid effluent;
- (c) separating said floc from said second fluid effluent in a suspended solids separator to form a third fluid effluent;
- (c) passing said third effluent through a fine solids filter device to form a forth fluid effluent;
- (d) passing said forth fluid effluent through a first membrane filter set of a membrane filter unit to form a first permeate fluid and a first concentrate fluid;
- (f) adding an acid to said first permeate fluid forming a second permeate fluid;
- (g) passing said second permeate fluid through a second membrane filter set of said membrane filter unit to form a third permeate fluid and a second concentrate fluid;
- (h) passing said first concentrate fluid through a third membrane filter set of said membrane filter unit to form a fourth permeate fluid and a third concentrate fluid;
- (i) passing said third concentrate fluid through a fourth membrane filter set of said membrane filter unit to form a fifth permeate fluid and a fourth concentrate fluid; and
- (j) wherein said third permeate fluid is reclaimed water and said fourth concentrate fluid is liquid fertilizer.

In another embodiment, the method further comprising the step of admixing said fourth permeate fluid and said first permeate fluid.

In another embodiment, the method further comprising the step of admixing said second concentrate fluid and said second permeate fluid.

In another embodiment, the method further comprising the step of admixing said fifth permeate fluid with said first fluid effluent.

In another embodiment, the method further comprising the step of adding an acid to said third concentrate fluid.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The accompanying drawings, which are included to provide further understanding of the invention and are incorporated in and constitute a part of this specification, illustrate preferred embodiments of the invention and together with the description serve to explain the principles of the invention, in which.

DETAILED DESCRIPTION OF THE INVENTION

Figure 1:
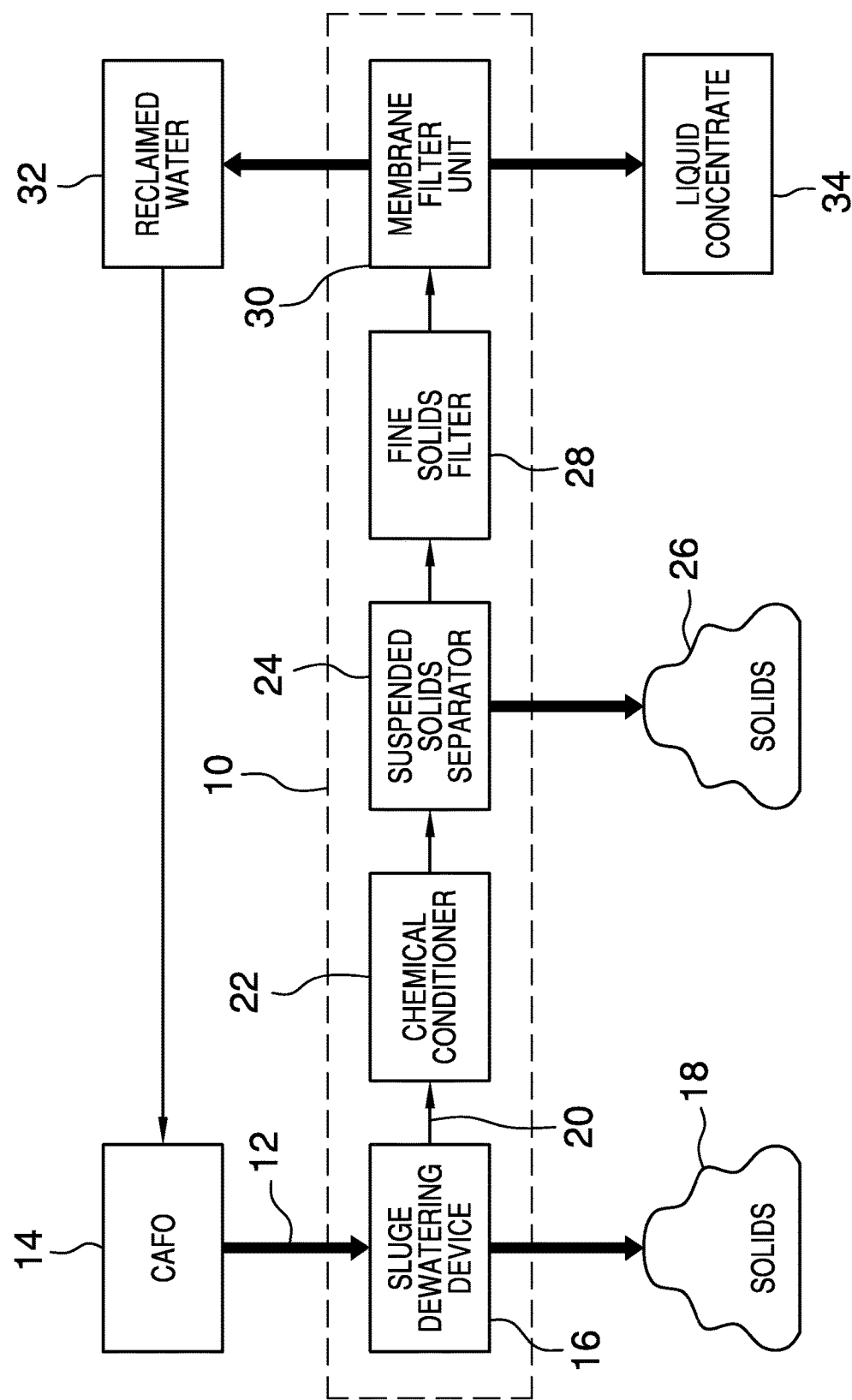
FIG. 1 is a high level schematic view of a livestock wastewater treatment system and method thereof in accordance with the principles of the present invention.

Reference will now be made in detail to the preferred embodiments of the present invention, examples of which are illustrated in the accompanying drawings. Referring initially to FIG. 1 there is shown a high level diagram of a livestock wastewater treatment system 10 in accordance with the present invention, herein after referred to as treatment system. The treatment system 10 is particularly useful for treating wastewater produced by a confined animal feeding operation (CAFO) facility to reclaim water and solids from the wastewater, and to reduce the environmental footprint of the CAFO facility.

Broadly, as shown in FIG. 1, the treatment system 10 combines both mechanical and chemical water treating and includes separation of liquids from solids, collection of the separated solids at various stages, and treatment of the remaining liquid so that it can be reclaimed. Wastewater 12 produced, for example, by a CAFO facility 14 is received by a sludge dewatering device 16. The wastewater 12 at this stage is includes a majority of water with admixed solids. The terms water, liquid and fluid are used herein interchangeably. The solids, in addition to solid and dissolved manure, can include animal byproducts, such as hair, bedding, grain, sand and other small particles. Several nutrients are dissolved in the water including phosphorous (P), nitrogen (N) and potassium (K), among others. In the sludge dewatering device 16, undissolved solids in the wastewater are removed from the liquid portion of the wastewater. The removed solids 18 are discharged and are suitable for land spreading as a fertilizer. The remaining liquid 20 is passed to a chemical conditioner 22. In the chemical conditioner 22 a flocculent is added to the liquid 20. After the addition of the flocculent the liquid 20 passes through a suspended solids separator 24. The suspended solids separator 24 removes and separates additional solids 26 from the liquid 20. These solids, can be dewatered separately and used for fertilizer, or can returned to the sludge dewatering device 16 to be recirculated through the treatment system 10. The remaining liquid 20 is passed through a fine solids filter 28 to remove any additional undissolved solids from the liquid prior to being passed through a membrane filter unit 30. In the membrane filter unit 30 the liquid 20 is filtered to form reclaimed water 32 and concentrated liquid fertilizer 34. The reclaimed water is suitable for use at the facility for various purposes, including drinking water for the livestock.

Figure 2:
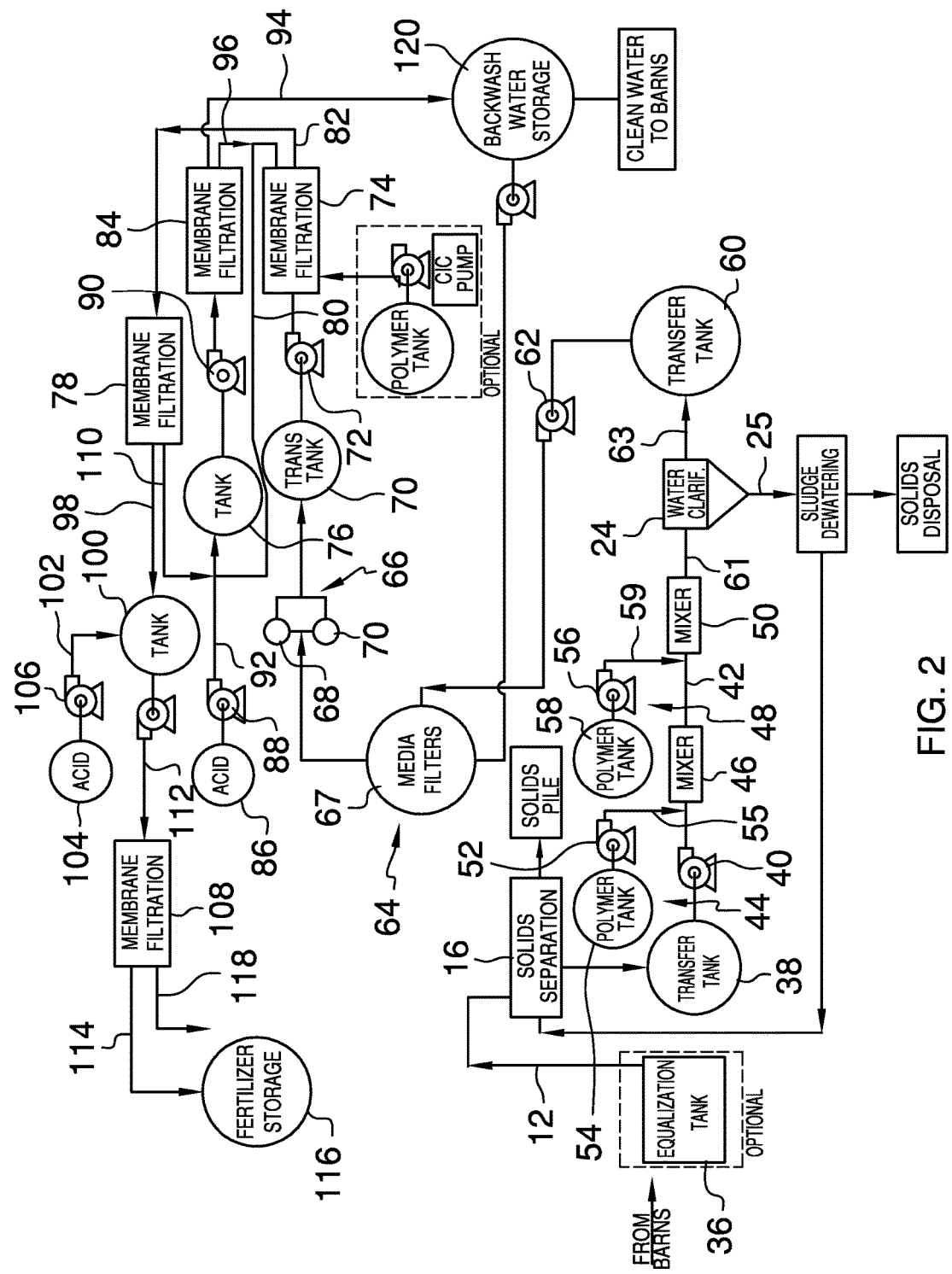
FIG. 2 is a schematic view of the livestock wastewater treatment system of FIG. 1.

With reference to FIG. 2, a more detailed explanation of the treatment system 10 can be had. As explained, above the treatment system 10 includes a sludge dewatering device 16 that receives wastewater 12 from a CAFO facility. Optionally, the wastewater 12 can be received by an equalization tank 36 prior to being passed to the sludge dewatering device 16. From the equalization tank 36, the wastewater 12 is passed to the sludge dewatering device 16. In one embodiment, the sludge dewatering device 16 is a screw filter press of the type having a rotary screw of progressively reducing pitch within a cylindrical-shaped screen or cone-shaped screen. Screw presses of this type are well known in the art, and a such a specific discussion of their construction is not required here. However, generally, material entering the screw press is gradually subjected to increasing pressure as it moved towards the solids discharge of the press by the rotating screw. The increasing pressure causes the liquid to be pressed from the solids through the screen where the liquid is collected. In one embodiment a screw filter press 16 is provided with three stages of compression.

In the screw filter press 16, undissolved solids in the wastewater 12 are removed from the liquid portion of the wastewater. The removed solids 18 are discharged and are suitable for land spreading as a fertilizer. A transfer tank 38 can be fluidically connected to the screw press 16 to receive the liquid for further processing. Inlet of pump 40 is connected to the transfer tank 38. Pump 40 is automated to control the level of liquid contained in the transfer tank 38, and operates to pump process liquid from the transfer tank through the chemical conditioner 22 and into the suspended solids separator 24.

The chemical conditioner 22 includes a conduit 42, a first chemical injector 44, an inline mixer 46, a second chemical injector 48 and a second inline mixer 50. Conduit 42 is connected to the discharge of pump 40 and to the inlet of the suspended solids separator 24. The first chemical injector 44 includes a chemical injector pump 52 fluidically connected to chemical storage tank 54 and to conduit 42. Inline mixer 46 is connected to conduit 42 downstream of chemical injector 44. Chemical injector 48 includes a chemical injector pump 56 fluidically connected to chemical storage tank 58 and to conduit 42 downstream of mixer 46. Inline mixer 50 is connected to conduit 42 downstream of chemical injector 48. Chemical injector pumps 52 and 56 operate to pump flocculants 55 and 59 contained in chemical storage tanks 54 and 58 respectively into conduit 42 to be entrained in the process liquid passing therethrough. The process liquid and flocculants are thoroughly mixed together when passed through mixers 46 and 50. The inline mixers 46 and 50 ensure rapid mixing of the flocculants and the process liquid as well as completeness of the chemical reaction between the flocculent components and the components of the process liquid.

Flocculants are chemicals that promote flocculation by causing colloids and other suspended particles in liquids to aggregate, forming floc. Flocculants are used in water treatment processes to improve the sedimentation or filterability of small particles. Preferably, food grade flocculants are chosen for use in this treatment system to meet government standards for water treatment compounds that may come into contact with food products. These are required for working on livestock sites to protect the animals from coming into contact with any potentially dangerous or hazardous chemical. Preferable flocculent chemicals for the first injection include those that are composed of 5-50% by weight of sodium hydroxide and 30-60% by weight of sodium aluminate such as Nalco N2 or Aluminex 1 both available by Nalco Company of Naperville, Ill. This stage begins to clear the wastewater such that the polymers can bind effectively in the second injection stage. Preferred flocculent chemicals for the second injection include are nonionic or anionic acrylic polymers which are composed of 10-30% of polyacrylamide and 10-30% of an aliphatic hydrocarbon such as N3100L available by Alken-Murray Corporation of New Hyde Park, N.Y. Other suitable flocculants are Superfloc C-492 available by Brenntag Canada Inc. of Toronto, Ontario; P-112 and P508 available by Chemco Products of Howell, Mich.; and Nalclear 8181 available by Nalco Company.

In the suspended solids separator 24 solids formed by the flocculation in the chemical condition, and other suspended solids admixed with process liquid 61 are caused to be removed and separated. The separated solids 25 can be dewatered and used for fertilizer or can be recirculated to the sludge dewatering device 16. In one embodiment, the solids rich process liquid is caused to come into contact with clarifier plates as the process liquid passes through the solids separator 24. Contact with the clarifier plates results in the suspended solids dropping under gravity from the process liquid into a hopper area at the bottom of the suspended solids separator. The process liquid flows through adjustable weirs at the top of the suspended solids separator.

In one embodiment, the suspended solids separator 24 is a lamella plate clarifier. In one embodiment, the solids separator 24 is an inclined lamella plate clarifier. In one embodiment, the inclined lamella plate clarifier includes clarifier plates that are composed of a fiber reinforced plastic. The clarifier plates are arranged in away to reduce the overall footprint of the suspended solids separator 24. In one embodiment, the clarifier plates can be set at a 55 degree incline and spaced 2 inches apart. This inclined layering of the clarifier plates increases the projected surface area of the process liquid resulting in increased solids removal. Suitable inclined plate clarifiers are provided by Unipure, Parkson Corporation and Great Lakes Bio Systems, Inc.

The suspended solids separator 24 is fluidically connected to a collection tank 60 to receive process liquid 63 from the suspend solids separator. The inlet of pump 62 is fluidically connected to the collection tank 60, and the discharge of pump 62 is fluidically connected to the fine solids filter 28. Pump 62 is operated to pump process fluid from collection tank 60 through the fine solids filter 28. The fine solids filter 28 can include a first stage filter 64 and a second stage filter 66. The process liquid is pumped through the first stage filter 64 and then through the second stage filter 66. The first stage filter 64 can include a canister filter 67 having different filter media. In one embodiment, the first stage filter is a pressurized canister filter containing layers of gravel, silica sand, and anthracite coal as the filter media. The second stage filter 66 includes a pair of bag filters 68 and 70 fluidically connected in parallel. Bag filters are well known in the liquid filtration industry, and as such, a specific description is not required here. However, in general, a bag filter includes a bag of a mesh material located in a filter housing through which fluid is passed at elevated pressures. Under pressure, the fluid flows through the bag, but solid particulates are prevented from flowing through the bag.

The fine solids filter 28 is fluidically connected to collection tank 70 to receive process liquid from the fine solids filter. The inlet of pump 72 is fluidically connected to collection tank 70, and the discharge of pump 72 is fluidically connected to the membrane filter unit 30. Pump 72 is operated to pump process fluid from collection tank 70 to the membrane filter unit 30. With continued reference to FIG. 2, the membrane filter unit 30 will be described, and more specifically, the water polishing unit/leg of membrane filter unit 30 will be described. Membrane filter set 74 is connected to the discharge of pump 72 to receive process fluid from collection tank 70. The permeate discharge 80 of the membrane filter set 74 is fluidically connected to collection tank 76. In collection tank 76, permeate discharge is treated with an acid 92 stored in tank 86, such as nitric or sulfuric acid, which is pumped into collection tank 76 by pump 88 to condition the permeate discharge prior to being passed through membrane filter set 84. The acid treatment converts ammonia to ammonium salt to be removed by membrane filter set 84. The temperature of permeate discharge held in collection tank 76 is controlled to be between 10 and 30 degrees Celsius. Inlet of pump 90 is connected to collection tank 76, and membrane filter set 84 is connected to the discharged of pump 90 to receive the acid treated permeate from tank 76. Permeate discharge 94 is reclaimed water suitable for use as a backwash water to clean the various filter elements of the system, or as drinking water for livestock, and may be stored in tank 120. Concentrate discharge 96 of membrane filter set 84 can be recirculated to collection tank 76 or back to transfer tank 38 for recirculation through the treatment system 10.

With continued reference to FIG. 2, the liquid concentrating unit/fluid flow of membrane filter unit 30 will be described. The concentrate discharge of the membrane filter set 74 is connected to membrane filter set 78 for passing concentrate discharge 82 therethrough. The concentrate discharge of membrane filter set 78 is connected to collection tank 100 for receiving concentrate discharge 98 therefrom, and the permeate discharge 110 of membrane filter set 78 can be recirculated to tank 76. In collection tank 100, concentrate discharge 98 is treated with an acid 102 stored in tank 104, such as nitric or sulfuric acid, which is pumped into collection tank 100 by pump 106 to condition concentrate discharge 98 prior to being passed through membrane filter set 108. The inlet of pump 112 is connected to collection tank 100, and membrane filter set 108 is connected to the discharge of pump 112 to receive concentrate discharge from tank 100. The concentrate discharge 114 of membrane filter set 108 is concentrated liquid fertilizer, which is stored in tank 116. The permeate discharge 118 of membrane filter set 108 can be either stored in tank 120 or recirculated to tank 38 for recirculation through the treatment system 10.

Figure 3:
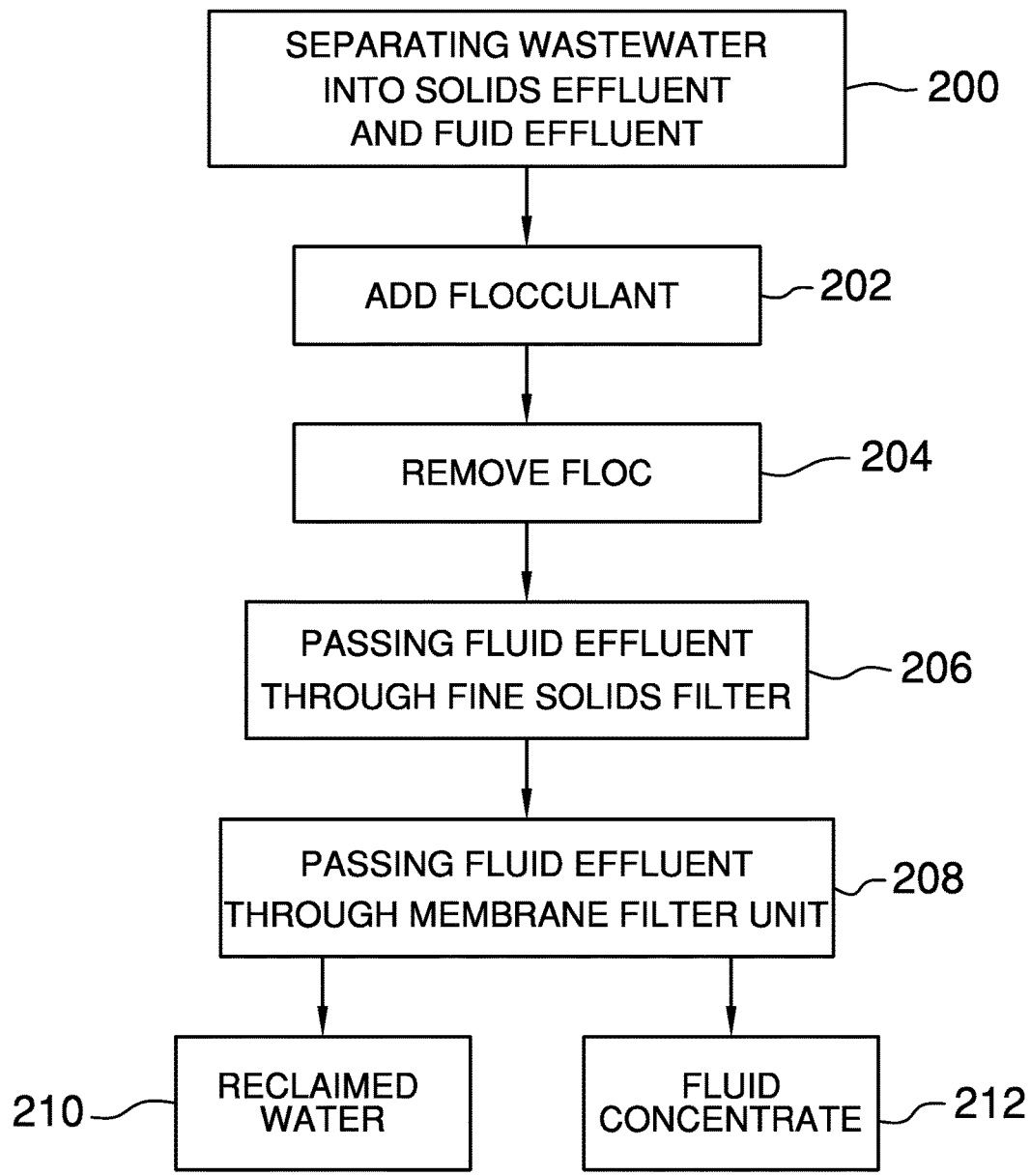
FIG. 3 is a flow diagram of a method of treating livestock wastewater with the livestock wastewater treatment system in accordance with a first embodiment.

It now can be understood, a method of treating wastewater by the treatment system 10 is described with reference to FIG. 3. A solids-fluid wastewater mixture is separated into a solids effluent and first fluid effluent in a sludge dewatering device (200). The sludge dewatering device can be a screw filter press. The solids effluent, being dewatered to about 30% by weight liquid, is suitable for land spreading. One or more flocculent is added to the first fluid effluent to cause the first fluid effluent to undergo flocculation forming a second fluid effluent (202). The floc is separated from the second fluid effluent in a suspended solids separator forming a third effluent (204). The suspended solids separator can be a lamellar plate clarifier. The thirds fluid effluent is passed through a fine solids filter device forming a fourth fluid effluent (206). The forth fluid effluent is passed through a membrane filter unit forming permeate fluid and a fluid concentrate (208). The permeate fluid can be reclaimed water (210) and the fluid concentrate can be a liquid fertilizer (212).

Figure 4:
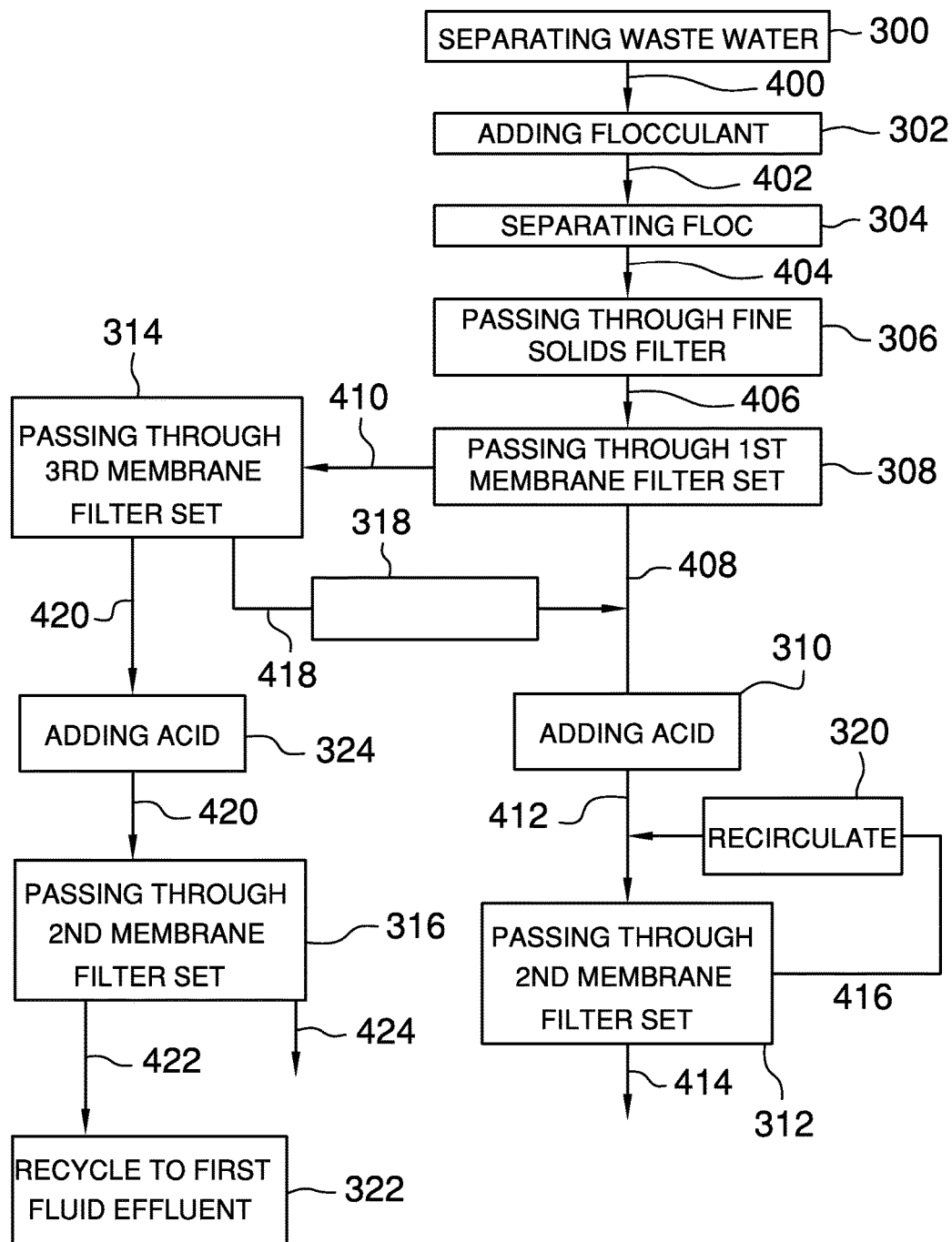
FIG. 4 is a flow diagram of a method of treating livestock wastewater with the livestock wastewater treatment system in accordance an other embodiment.

In another embodiment, a method of treating wastewater by the treatment system 10 is described with reference to FIG. 4. A solids-fluid wastewater mixture is separated into a solids effluent and first fluid effluent 400 in a sludge dewatering device (300). The solids effluent, being dewatered to about 30% by weight liquid, is suitable for land spreading. One or more flocculent is added to the first fluid effluent 400 to cause the first fluid effluent to undergo flocculation causing suspended solids in the first fluid effluent to aggregate into floc and forming a second fluid effluent 402 (302). The floc is separated/removed from the second fluid effluent 402 forming a third fluid effluent 404 (304). The third effluent 404 is passed through a fine solids filter device to form a forth fluid effluent 406 (306). The forth fluid effluent 406 is passed through a first membrane filter set of a membrane filter unit to form a first permeate fluid 408 and a first concentrate fluid 410 (308). An acid is added to the first permeate fluid 408 forming a second permeate fluid 412 (310). The second permeate fluid 412 is passed through a second membrane filter set of the membrane filter unit to form a third permeate fluid 414 and a second concentrate fluid 416 (312). The first concentrate fluid 410 is passed through a third membrane filter set of the membrane filter unit to form a fourth permeate fluid 418 and a third concentrate fluid 420 (314). The third concentrate fluid 420 is passed through a fourth membrane filter set of the membrane filter unit to form a fifth permeate fluid 422 and a fourth concentrate fluid 424 (316). The third permeate fluid 414 being reclaimed water and the fourth concentrate fluid 424 being liquid fertilizer. The fourth permeate fluid 418 can be admixed with the first permeate fluid 408 (318). The second concentrate fluid 416 can be admixed with the second permeate fluid 412 (320). The fifth permeate fluid 422 can be admixed with the first fluid effluent 400 (322). An acid can be added to the third concentrate fluid 420 (324).

While the foregoing description of the treatment system is made in particular connection with livestock wastewater, the treatment system and methods thereof can be used to process wastewater from other sources, and thus should not be limited to only livestock wastewater.

A number of embodiments of the present invention have been described. Nevertheless, it will be understood that various modifications may be made without departing from the spirit and scope of the invention. Accordingly, other embodiments are within the scope of the following claims.

What is claimed is:

1. A livestock wastewater treatment method, comprising the steps of:
    separating a solids-fluid wastewater mixture that comprises manure in a sludge dewatering device into a solids effluent and a first fluid effluent;
    adding first and second flocculants to said first fluid effluent causing suspended solids in said first fluid effluent to aggregate into floc to form a second fluid effluent, said first flocculant comprising about 5-50% by weight sodium hydroxide and about 30-60% by weight sodium aluminate, said second flocculant comprising nonionic or anionic acrylic polymers;
    separating said floc from said second fluid effluent in a suspended solids settling tank separator to form a third fluid effluent;
    passing said third effluent through a fine solids filter device to form a fourth fluid effluent; and
    passing said fourth fluid effluent through a membrane filter unit to form permeate fluid and a fluid concentrate.

2. The livestock wastewater treatment method of claim 1, wherein said permeate fluid is reclaimed water, and said concentrate fluid is liquid fertilizer.

3. The livestock wastewater treatment method of claim 1, wherein said sludge dewatering device is a screw press.

4. The livestock wastewater treatment method of claim 1, wherein said suspended solids settling tank separator is a lamellar plate clarifier.

5. A livestock wastewater treatment method, comprising the steps of:
    separating a solids-fluid wastewater mixture that comprises manure in a sludge dewatering device into a solids effluent and a first fluid effluent;
    adding first and second flocculants to said first fluid effluent causing suspended solids in said first fluid effluent to aggregate into floc to form a second fluid effluent, said first flocculant comprising about 5-50% by weight sodium hydroxide and about 30-60% by weight sodium aluminate;
    separating said floc from said second fluid effluent in a suspended solids separator to form a third fluid effluent;
    passing said third effluent through a fine solids filter device to form a fourth fluid effluent;
    passing said fourth fluid effluent through a first membrane filter set of a membrane filter unit to form a first permeate fluid and a first concentrate fluid;
    adding an acid to said first permeate fluid forming a second permeate fluid;
    passing said second permeate fluid through a second membrane filter set of said membrane filter unit to form a third permeate fluid and a second concentrate fluid;
    passing said first concentrate fluid through a third membrane filter set of said membrane filter unit to form a fourth permeate fluid and a third concentrate fluid;
    passing said third concentrate fluid through a fourth membrane filter set of said membrane filter unit to form a fifth permeate fluid and a fourth concentrate fluid; and
    wherein said third permeate fluid is reclaimed water and said fourth concentrate fluid is liquid fertilizer.

6. The livestock wastewater treatment method of claim 5, further comprising the step of:
    admixing said fourth permeate fluid and said first permeate fluid.

7. The livestock wastewater treatment method of claim 5, further comprising the step of:
    admixing said second concentrate fluid and said second permeate fluid.

8. The livestock wastewater treatment method of claim 5, further comprising the step of:
    admixing said fifth permeate fluid with said first fluid effluent.

9. The livestock wastewater treatment method of claim 5, further comprising the step of:
    adding an acid to said third concentrate fluid.

10. A livestock wastewater treatment method, consisting essentially of the steps of:
    Separating a solids-fluid wastewater mixture that comprises manure in a sludge dewatering device into a solids effluent and a first fluid effluent;
    Adding first and second flocculants to said first fluid effluent causing suspended solids in said first fluid effluent to aggregate into floc to form a second fluid effluent, said first flocculant comprising about 5-50% by weight sodium hydroxide and about 30-60% by weight sodium aluminate and said second flocculant comprises nonionic or anionic acrylic polymers;
    Separating said floc from said second fluid effluent in a suspended solids settling tank to form a third fluid effluent;
    Passing said third effluent through a fine solids filter device to form a fourth fluid effluent; and
    Passing said fourth fluid effluent through a membrane filter unit to form permeate fluid and a fluid concentrate.

11. The livestock wastewater treatment method of claim 10, wherein said permeate fluid is reclaimed water, and said concentrate fluid is liquid fertilizer.

12. The livestock waste water treatment method of claim 10, wherein said sludge dewatering device is a screw press.

13. The livestock wastewater treatment method of claim 10, wherein said suspended solids settling tank is a lamellar plate clarifier.

14. The livestock wastewater treatment method of claim 1, wherein the solids are a solid fertilizer.

15. The livestock wastewater treatment method of claim 5, wherein the solids are a solid fertilizer.

16. The livestock wastewater treatment method of claim 10, wherein the solids are a solid fertilizer.

17. The livestock wastewater treatment method of claim 1, wherein said first flocculant makes the wastewater mixture more basic.

18. The livestock wastewater treatment method of claim 1, wherein said solids comprise a large majority of the phosphorous of the wastewater mixture and are adapted to be used as a fertilizer.

* * * * *